United States Patent
Kimoto et al.

(10) Patent No.: US 11,450,453 B2
(45) Date of Patent: Sep. 20, 2022

(54) WIRE HARNESS, AND EXTERIOR MEMBER

(71) Applicants: AUTONETWORKS TECHNOLOGIES, LTD., Yokkaichi (JP); SUMITOMO WIRING SYSTEMS, LTD., Yokkaichi (JP); SUMITOMO ELECTRIC INDUSTRIES, LTD., Osaka (JP)

(72) Inventors: Yuichi Kimoto, Yokkaichi (JP); Takeshi Shimizu, Yokkaichi (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(*) Notice: Subject to any disclaimer, the term of this patent is extended or adjusted under 35 U.S.C. 154(b) by 0 days.

(21) Appl. No.: 17/281,449

(22) PCT Filed: Jul. 18, 2019

(86) PCT No.: PCT/JP2019/028286
§ 371 (c)(1),
(2) Date: Mar. 30, 2021

(87) PCT Pub. No.: WO2020/070950
PCT Pub. Date: Apr. 9, 2020

(65) Prior Publication Data
US 2022/0005627 A1 Jan. 6, 2022

(30) Foreign Application Priority Data
Oct. 5, 2018 (JP) .............................. JP2018-190226

(51) Int. Cl.
| | | |
|---|---|---|
| B60R 16/02 | (2006.01) | |
| H01B 7/18 | (2006.01) | |
| H01B 7/00 | (2006.01) | |

(52) U.S. Cl.
CPC ......... *H01B 7/1805* (2013.01); *H01B 7/0045* (2013.01); *B60R 16/0207* (2013.01)

(58) Field of Classification Search
CPC combination set(s) only.
See application file for complete search history.

(56) References Cited

U.S. PATENT DOCUMENTS

| | | | |
|---|---|---|---|
| 2011/0083899 A1 | 4/2011 | Mori | |
| 2012/0152588 A1* | 6/2012 | Asztalos | ................ H02G 3/045 174/68.3 |

(Continued)

FOREIGN PATENT DOCUMENTS

| | | |
|---|---|---|
| JP | 2002-186131 A | 6/2002 |
| JP | 2009-296743 A | 12/2009 |

(Continued)

OTHER PUBLICATIONS

Oct. 8, 2019 Search Report issued in International Patent Application No. PCT/JP2019/028286.

*Primary Examiner* — Paresh Paghadal
(74) *Attorney, Agent, or Firm* — Oliff PLC

(57) ABSTRACT

A wire harness including: an electrical wire; and an exterior pipe through which the electrical wire is inserted, wherein the exterior pipe is provided with a plurality of discharge holes configured to outwardly discharge foreign matter that has entered between the exterior pipe and the electrical wire. An exterior pipe through which an electrical wire is to be inserted, the exterior pipe including: a body with a plurality of discharge holes configured to outwardly discharge foreign matter that has entered between the body and the electrical (Continued)

wire, wherein the plurality of discharge holes are provided in an aligned arrangement.

7 Claims, 5 Drawing Sheets

(56) References Cited

U.S. PATENT DOCUMENTS

2014/0262421 A1* 9/2014 Kaihotsu .............. H02G 3/0487
174/68.3
2018/0183223 A1* 6/2018 Kloft ................... H02G 3/0437

FOREIGN PATENT DOCUMENTS

| JP | 2015-180168 A | 10/2015 |
| JP | 2016-201336 A | 12/2016 |
| JP | 2017-158299 A | 9/2017 |

* cited by examiner

WIRE HARNESS, AND EXTERIOR MEMBER

BACKGROUND

The present disclosure relates to a wire harness and an exterior member.

Conventionally, a wire harness in which the outside of an electrical wire member is covered with an exterior member such as a corrugated tube or a resin pipe is known as an example of a wire harness for a vehicle such as a hybrid vehicle or an electric vehicle. Such a wire harness is sometimes routed under the floor of the vehicle and exposed to the outside for example, and therefore in some cases the wire harness is covered with various types of exterior members, and a foam member is also provided between adjacent exterior members in order to prevent foreign matter such as sand from entering between the exterior members and the electrical wire member (e.g., see JP 2016-201336A). With such a configuration, it is possible to reduce the possibility that the electrical wire member is damaged due to rubbing against foreign matter such as sand over a long period of time.

SUMMARY

However, in a configuration for preventing foreign matter such as sand from entering between the exterior members and the electrical wire member by using another member such as a foam member as described above, the configuration becomes complicated, and the number of parts and the number of assembly steps increase for example, thus leading to an increase in cost. For this reason, there is a demand for a wire harness that has a simple structure and suppresses damage to the electrical wire member.

An exemplary aspect of the disclosure provides a wire harness and an exterior member capable of favorably protecting an electrical wire member with a simple configuration.

A wire harness in one aspect includes: an electrical wire; and an exterior pipe through which the electrical wire is inserted, wherein the exterior pipe is provided with a plurality of discharge holes configured to outwardly discharge foreign matter that has entered between the exterior pipe and the electrical wire.

According to this configuration, a large number of discharge holes that are capable of outwardly discharging foreign matter that has entered between the exterior pipe and the electrical wire are provided in an aligned arrangement in the exterior pipe, thus making it possible to discharge foreign matter through the discharge holes, and making it possible to prevent foreign matter from being held between the exterior pipe and the electrical wire. Accordingly, the electrical wire is prevented from becoming damaged due to rubbing against foreign matter such as sand over a long period of time, and it is possible to favorably protect the electrical wire with a simple configuration.

A configuration is possible in which the exterior pipe has a honeycomb structure in which the plurality discharge holes are formed in a hexagonal shape.

According to this configuration, the discharge holes of the exterior pipe are formed in a hexagonal shape to form a honeycomb structure, thus making it possible to improve the ability to discharge foreign matter through the discharge holes while also maintaining the high rigidity of the exterior pipe overall.

A configuration is possible in which chamfers are formed in ends of the plurality of discharge holes on an electrical wire side.

According to this configuration, chamfers are formed at the ends of the discharge holes on the electrical wire side, thus reducing the possibility that the electrical wire becomes damaged due to rubbing against the ends of the discharge holes on the electrical wire side.

A configuration is possible in which the exterior pipe is a sheet-shaped molded article that is rolled into a tubular shape.

According to this configuration, the exterior pipe is formed by rolling a sheet-shaped molded article into a tubular shape, thus making it is easy to perform mass manufacturing by, for example, molding a group of sheet-shaped molded articles at the same time in the molding step.

A configuration is possible in which a plurality of grooves that extend in an axial direction in a tubular state are formed in the exterior pipe at intervals in a circumferential direction.

According to this configuration, a plurality of grooves that extend in the axial direction in a tubular state are formed at intervals in the circumferential direction in the exterior pipe, and therefore the exterior pipe can be easily rolled into a tubular shape.

A configuration is possible in which one groove of the plurality of grooves is formed for each pair of discharge holes of the plurality of discharge holes that are adjacent in the circumferential direction.

According to this configuration, one groove is formed for each pair of discharge holes that are adjacent in the circumferential direction, and therefore the exterior pipe can be easily rolled into a tubular shape while maintaining the rigidity of the exterior pipe overall.

An exterior pipe is an exterior pipe through which an electrical wire is to be inserted, the exterior pipe includes a body with a plurality of discharge holes configured to outwardly discharge foreign matter that has entered between the body and the electrical wire, wherein the plurality of discharge holes are provided in an aligned arrangement.

According to this configuration, a large number of holes that are capable of outwardly discharging foreign matter that has entered between the body of the exterior pipe and the electrical wire are provided in an aligned arrangement in the exterior pipe, thus making it possible to prevent foreign matter from being held between the exterior pipe and the electrical wire. Accordingly, the electrical wire is prevented from becoming damaged due to rubbing against foreign matter such as sand over a long period of time, and it is possible to favorably protect the electrical wire with a simple configuration.

According to the wire harness and the exterior pipe of the present disclosure, it is possible to favorably protect an electrical wire with a simple configuration.

DETAILED DESCRIPTION OF EMBODIMENTS

Figure 1:
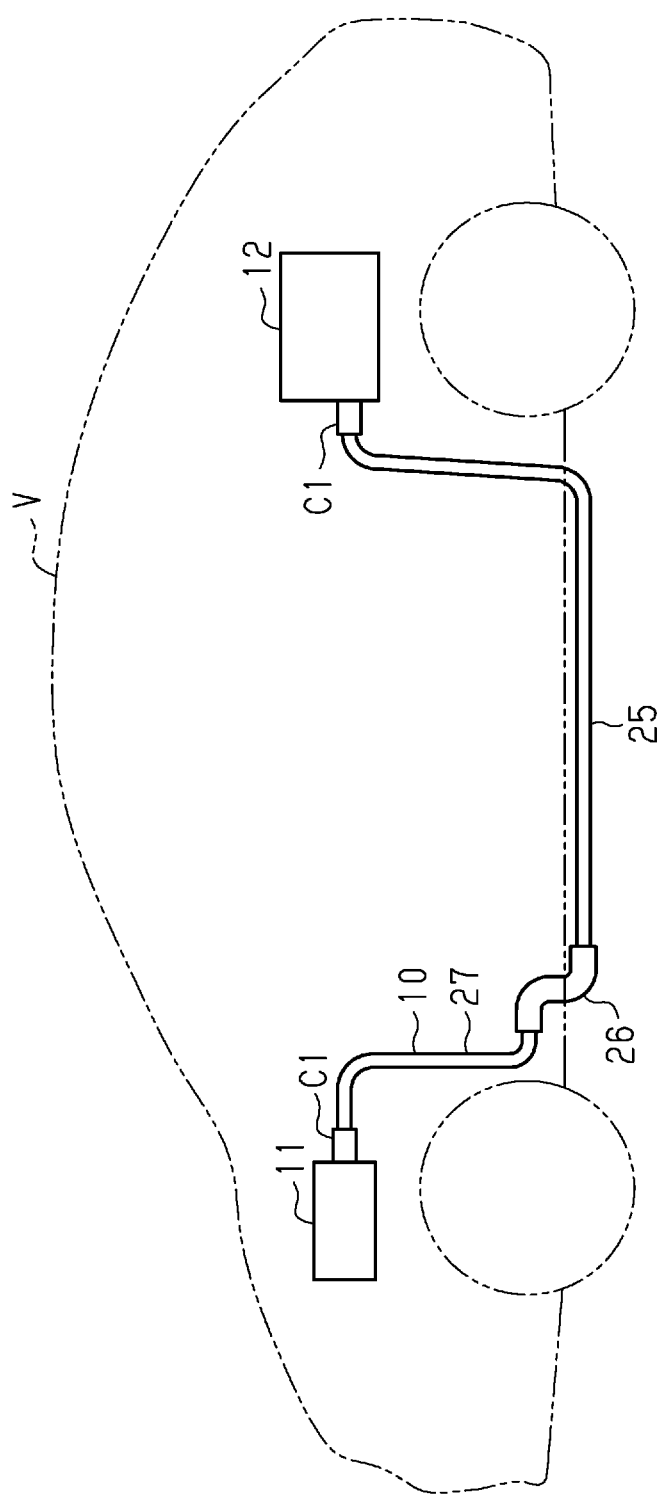
FIG. 1 is a schematic configuration diagram showing a wire harness according to an embodiment.

Hereinafter, an embodiment of the wire harness will be described with reference to FIGS. 1 to 4. Note that portions of the configuration may be exaggerated or simplified in the drawings for convenience in the description. Also, the dimensional ratios of portions may differ from the actual dimensional ratios.

As shown in FIG. 1, a wire harness 10 electrically connects two or three or more electrical devices (devices), and in this example, electrically connects an inverter 11, which is installed in the front portion of a vehicle V such as a hybrid vehicle or an electric vehicle, to a high-voltage battery 12 that is installed rearward of the inverter 11 in the vehicle V. The wire harness 10 is routed so as to pass under the floor of the vehicle V, for example, and has one end that is connected to the inverter 11 via one connector C 1, and another end that is connected to the high-voltage battery 12 via another connector Cl. The inverter 11 is connected to a wheel drive motor (not shown) that is a power source for the traveling of the vehicle. The inverter 11 generates AC power from DC power provided by the high-voltage battery 12, and supplies the AC power to the motor. The high-voltage battery 12 is, for example, a battery capable of supplying a voltage of 100 volts or more.

Figure 2:
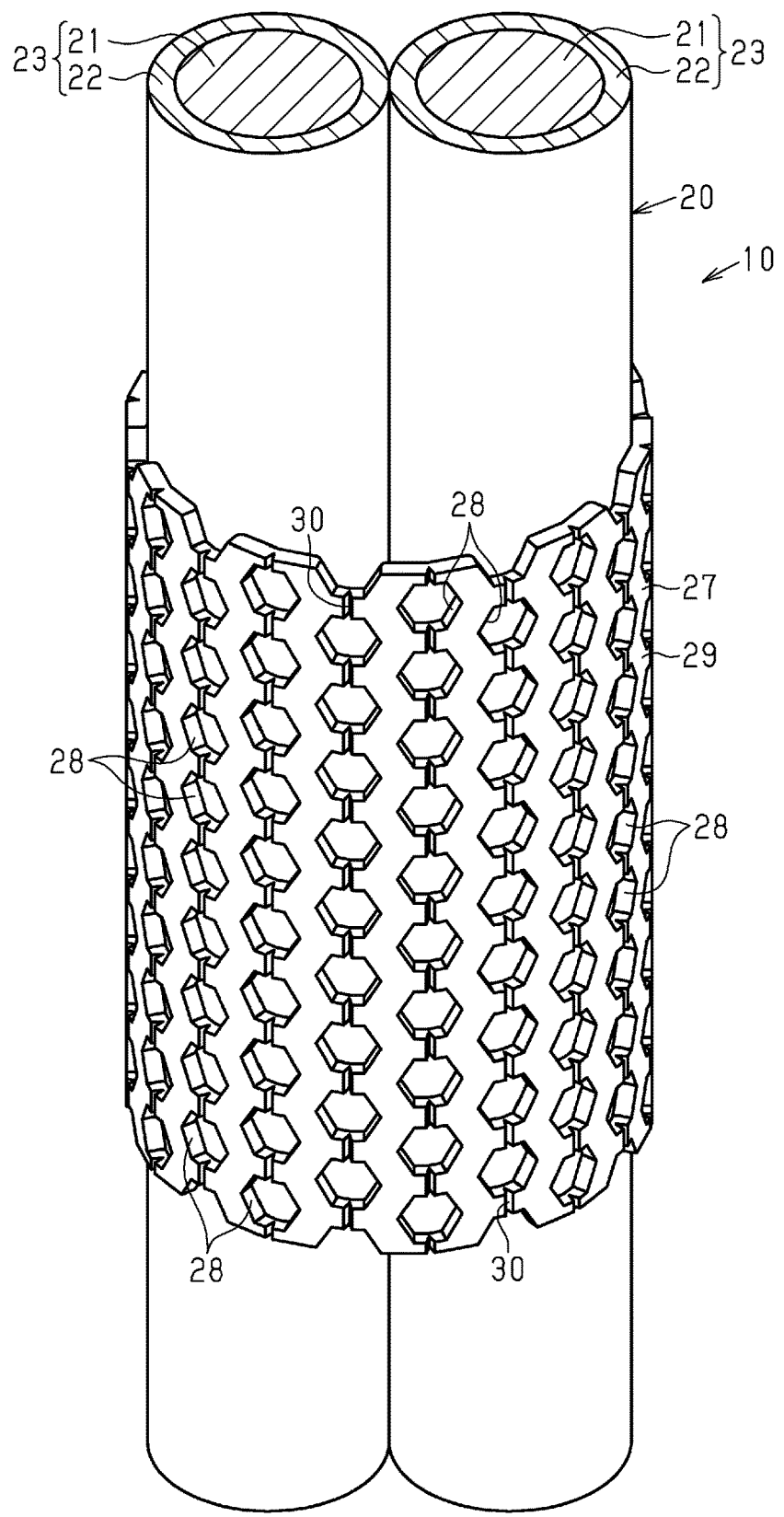
FIG. 2 is a partial perspective view of the wire harness according to the embodiment.

As shown in FIG. 2, the wire harness 10 includes an electrical wire member 20 (electrical wire), and the electrical wire member 20 includes a plurality of (two in the present embodiment) wires 23 that each have a core wire 21 and an insulating coating 22 that surrounds the core wire 21.

Further, as shown in FIG. 1, the wire harness 10 includes a metal pipe 25, a protector 26, and a resin pipe 27 as various exterior members (exterior pipes/bodies) or a series of exterior members (exterior pipes/bodies) through which the electrical wire member 20 is inserted. The metal pipe 25 is provided so as to extend from the high-voltage battery 12 and cover the electrical wire member 20 arranged under the floor of the vehicle V. The protector 26 is provided so as to cover a bent portion of the electrical wire member 20 on the inverter 11 side of the metal pipe 25. The resin pipe 27 is provided so as to cover the electrical wire member 20 between the protector 26 and the inverter 11.

Here, as shown in FIG. 2, the resin pipe 27 is provided with a large number of discharge holes 28 capable of outwardly discharging foreign matter such as sand that has entered between the resin pipe 27 and the electrical wire member 20. The resin pipe 27 of the present embodiment has a honeycomb structure in which the discharge holes 28 are formed in a hexagonal shape. Specifically, the hexagonal discharge holes 28 are arranged side-by-side at equal intervals along the axial direction, which is the extending direction of the electrical wire member 20, and are also arranged side-by-side at equal intervals along the circumferential direction, or in other words, discharge holes 28 that are adjacent to each other in the circumferential direction are offset in the axial direction, and thus the resin pipe 27 has a honeycomb structure.

Figure 3:
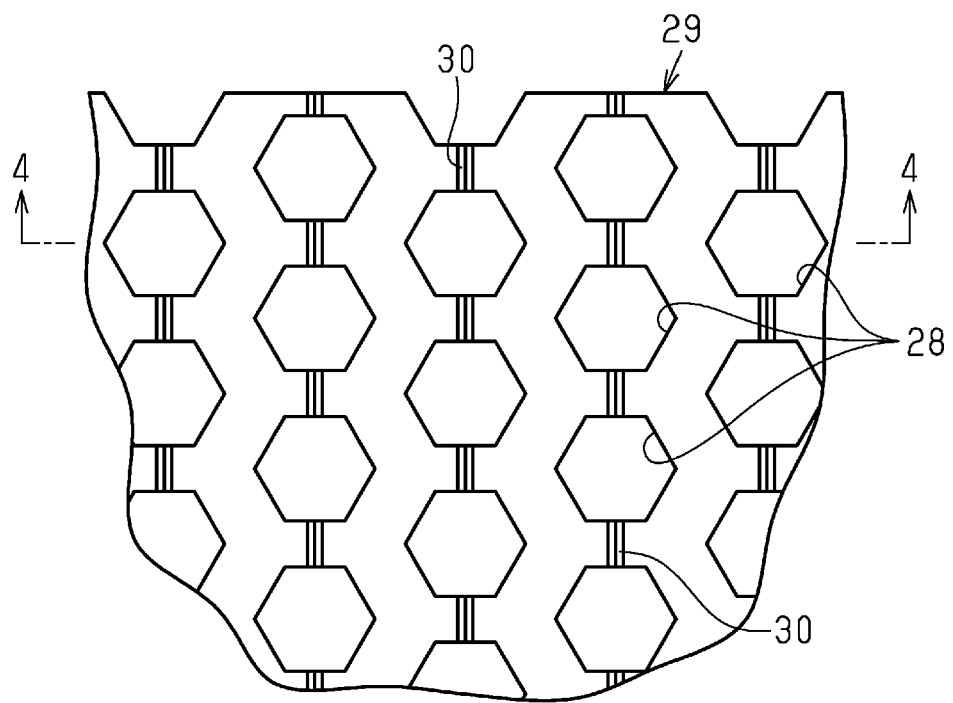
FIG. 3 is a partial plan view of a sheet-shaped molded article of the embodiment.
Figure 4:
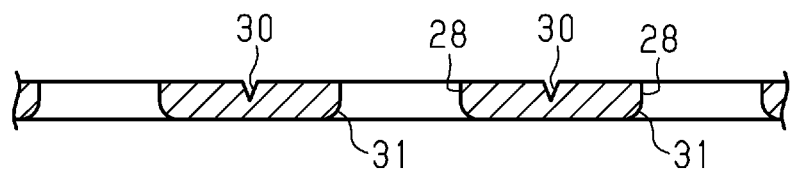
FIG. 4 is a cross-sectional view taken along line 4-4 in FIG. 3.

Also, as shown in FIGS. 2 to 4, the resin pipe 27 is a sheet-shaped molded article 29 that has been rolled into a tubular shape. The resin pipe 27 (sheet-shaped molded article 29) is provided with a plurality of groove portions 30 (grooves) that are formed at intervals in the circumferential direction and extend in the axial direction in the tubular state. The groove portions 30 are formed on the outer peripheral side of the resin pipe 27. One groove portion 30 is formed for each pair of discharge holes 28 that are adjacent in the circumferential direction. The groove portions 30 are each formed at a circumferential position that corresponds to the circumferential center between the pair of discharge holes 28, and are each formed between a pair of discharge holes 28 that are adjacent in the axial direction. As shown in FIG. 4, the groove portions 30 are formed in a V shape in which the width becomes narrower as the depth becomes deeper.

Also, as shown in FIG. 4, chamfered portions 31 (chamfers) having an R-shaped cross section are formed at the end portions (i.e., opening edges) of the discharge holes 28 on the electrical wire member 20 side (i.e., the inner peripheral side of the resin pipe 27). The chamfered portions 31 are formed around the entire circumference of the hexagonal contour of the discharge holes 28.

The following describes the operation of the wire harness 10 configured as described above.

For example, while the vehicle V is traveling, foreign matter such as sand on the ground is sometimes lifted up by the rotating tires, traveling wind, or the like and comes into contact with the wire harness 10. The foreign matter such as sand may then enter between the resin pipe 27 and the electrical wire member 20, but the foreign matter is discharged through the discharge holes 28.

Next, effects of the above embodiment will be described below.

(1) The resin pipe 27 is provided with a large number of aligned discharge holes 28 that are capable of outwardly discharging foreign matter that has entered between the resin pipe 27 and the electrical wire member 20, and therefore the foreign matter can be discharged through the discharge holes 28, and it is possible to prevent foreign matter from being held between the resin pipe 27 and the electrical wire member 20. Accordingly, it is possible to prevent the electrical wire member 20 from becoming damaged due to rubbing against foreign matter such as sand over a long period of time, and the electrical wire member 20 can be favorably protected with a simple configuration.

(2) The discharge holes 28 of the resin pipe 27 are formed in a hexagonal shape to form a honeycomb structure, thus making it possible to improve the ability to discharge foreign matter through the discharge holes 28 while also maintaining the high rigidity of the resin pipe 27 overall.

(3) The chamfered portions 31 are formed at the end portions of the discharge holes 28 on the electrical wire member 20 side, thus reducing the possibility that the electrical wire member 20 becomes damaged due to rubbing against the end portions of the discharge holes 28 on the electrical wire member 20 side.

(4) The resin pipe 27 is formed by rolling the sheet-shaped molded article 29 into a tubular shape, thus making it is easy to perform mass manufacturing by, for example, molding a group of sheet-shaped molded articles 29 at the same time in the molding step.

(5) The resin pipe 27 is provided with the groove portions 30 that are formed at intervals in the circumferential direction and extend in the axial direction in the tubular state, thus making it possible to be easily rolled into a tubular shape.

(6) One groove portion 30 is formed for each pair of discharge holes 28 that are adjacent in the circumferential direction, and therefore the resin pipe 27 can be easily rolled into a tubular shape while maintaining the rigidity of the resin pipe 27 overall.

The present embodiment can be implemented with modifications such as those described below. The present embodiment and the following modified examples can be implemented in combination with each other as long as no technical contradiction arises.

Although the discharge holes 28 are provided in the resin pipe 27 in the example in the above embodiment, a large number of discharge holes may be arranged side-by-side in another exterior member.

Figure 5:
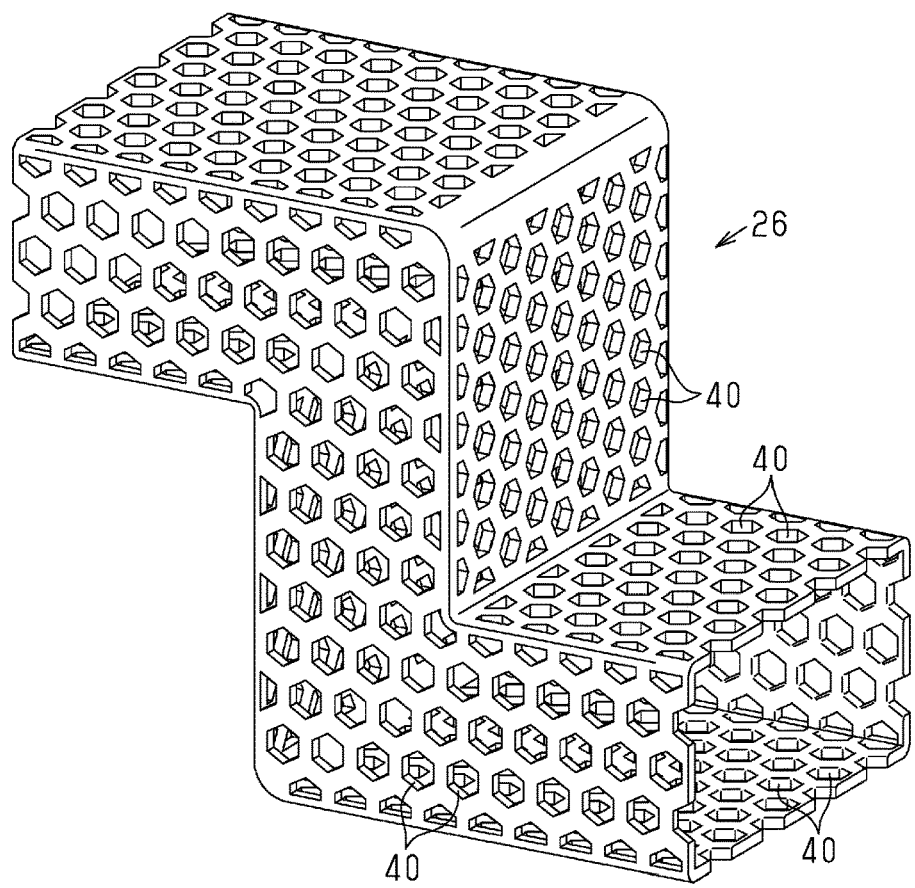
FIG. 5 is a perspective view of a protector in a variation.
Figure 6:
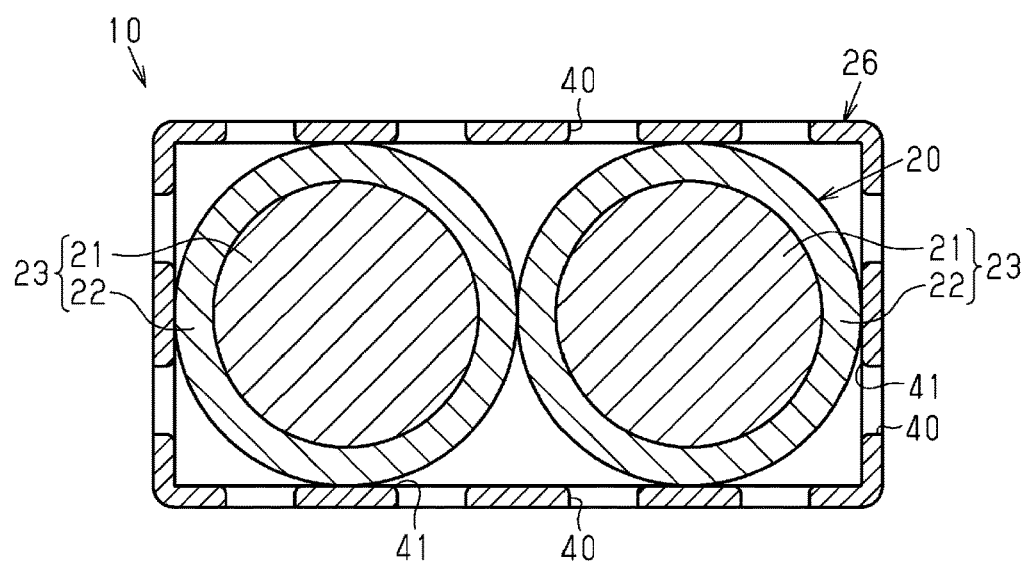
FIG. 6 is a cross-sectional view of the wire harness in a variation.

Specifically, for example, as shown in FIGS. 5 and 6, a large number of discharge holes 40 may be arranged side-by-side in the protector 26 serving as an exterior member. The protector 26 is constituted by a resin member, is formed in a substantially square tubular shape through which the electrical wire member 20 having two electrical wires 23 can be inserted, has a bent portion, and is configured to cause the path of the electrical wire member 20 to conform to the shape of the protector 26. A large number of discharge holes 40 are arranged side-by-side in surfaces of the protector 26. Further, in this example as well, the discharge holes 40 are formed in a hexagonal shape, and the protector 26 has a honeycomb structure. Further, in this example as well, as shown in FIG. 6, chamfered portions 41 are formed at end portions of the discharge holes 40 on the electrical wire member 20 side, that is, at the opening edges thereof. Effects similar to effects (1) to (3) of the above-described embodiment can be obtained in this case as well. Note that although the protector 26 shown in FIG. 5 has two right-angled bent portions, of course protectors 26 that have other shapes may be realized, such as having only one bent portion, or having a bent portion that is not right-angled.

Also, although the protector 26 is shown as a single integrally molded article that does not reversibly deform in this example (see FIGS. 5 and 6), the present disclosure is not limited to this, and the protector 26 may be constituted by a plurality of molded articles or may be a molded article that can reversibly deform.

Figure 7:
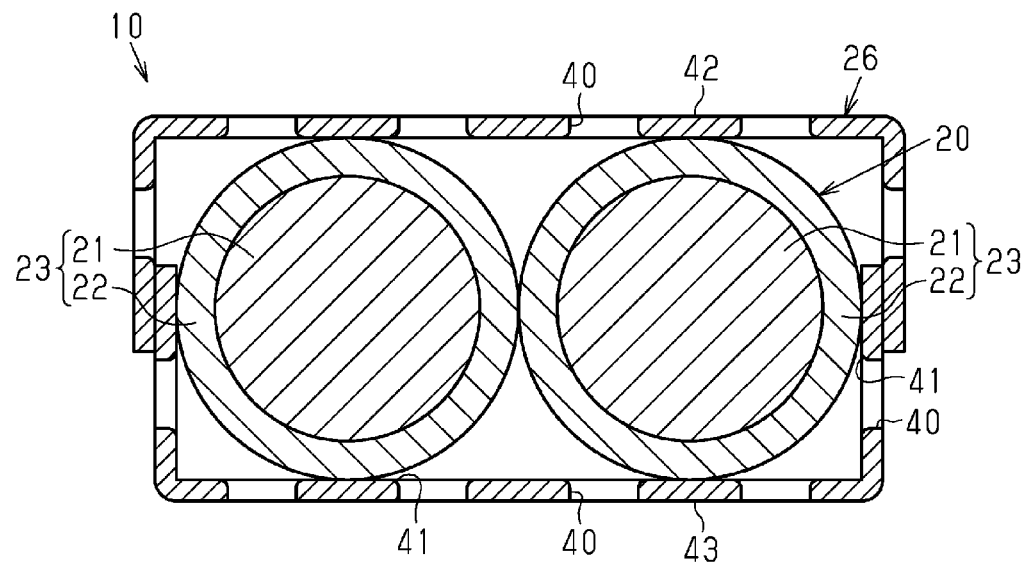
FIG. 7 is a cross-sectional view of the wire harness in a variation.

Specifically, as shown in FIG. 7 for example, the protector 26 may be constituted by a first molded article 42 and a second molded article 43, which are substantially halves of the protector 26.

Figure 8:
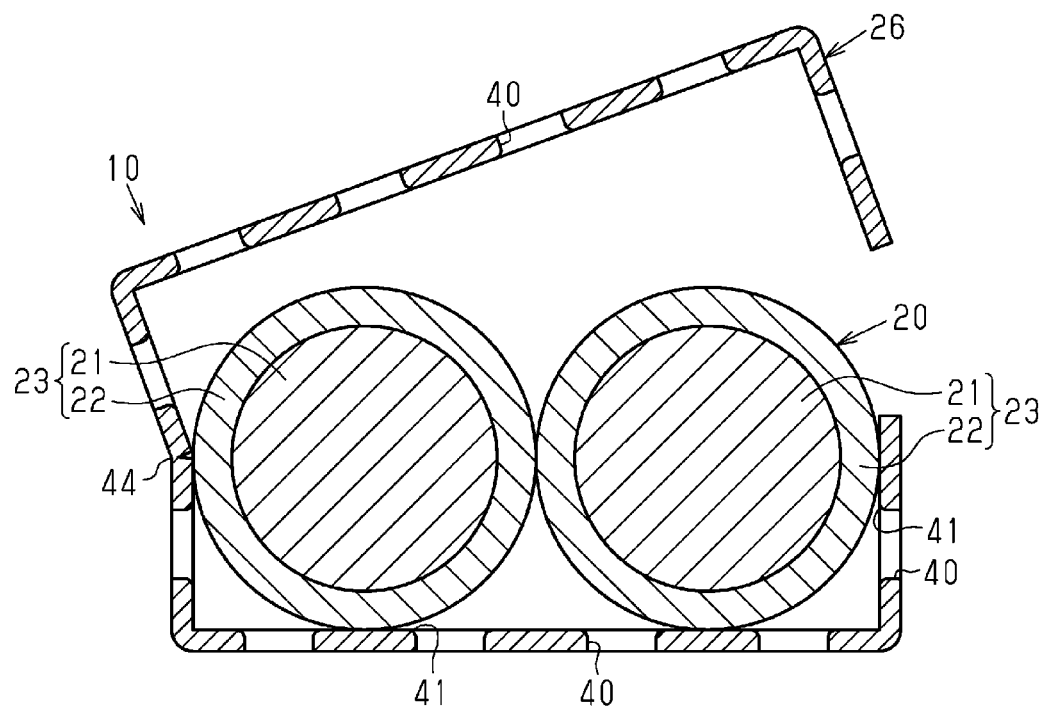
FIG. 8 is a cross-sectional view of the wire harness in a variation.

Also, as shown in FIG. 8 for example, the protector 26 may be configured to have a hinge portion 44 that can deform so as to open and close the protector 26. The hinge portion 44 may be a so-called integral hinge.

In the above embodiment, the discharge holes 28 and 40 are formed in a hexagonal shape, but the present disclosure is not limited to this, and other shapes such as a circular shape and a quadrangular shape may be used. In other words, the resin pipe 27 and the protector 26 (see FIG. 5) are not required to have a honeycomb structure. Also, although the discharge holes 28 and 40 are formed at equal intervals over the entirety of the resin pipe 27 and the protector 26 in the above embodiment, the present disclosure is not limited to this, and the discharge holes 28 and 40 may be arranged side-by-side in only a portion of the resin pipe 27 and the protector 26 (e.g., a lower portion when fixed to the vehicle V).

In the above embodiment, the chamfered portions 31 and 41, which are formed at the end portions of the discharge holes 28 and 40 on the electrical wire member 20 side (i.e., at the opening edges), have an R-shaped cross section (i.e., an outwardly convex curved surface), but the present disclosure is not limited to this, and the chamfered portions may have an inclined surface shape, or the chamfered portions may be omitted, for example.

In the above embodiment, the resin pipe 27 is formed by rolling the sheet-shaped molded article 29 into a tubular shape, but the present disclosure is not limited to this, and the resin pipe 27 may be originally formed in a tubular shape. Particularly in such a case, it is not necessary to form the groove portions 30. Also, even if the resin pipe 27 is obtained by rolling the sheet-shaped molded article 29 into a tubular shape, it is not necessary to form the groove portions 30. Further, the circumferential interval when forming the groove portions 30 may be changed, such as being changed to one every two discharge holes 28. Moreover, the groove portions 30 may have a shape other than the V shape.

Although the electrical wire member 20 is configured to include two electrical wires 23 in the above embodiment, it may be configured to include one or three or more electrical wires. Also, the electrical wire member 20 may be further provided with an electromagnetic shield member that surrounds the electrical wires 23, or with a braided member that is obtained by braiding metal strands and surrounds the electrical wire 23, for example. Note that the metal wires constituting the braided member may be made of an aluminum-based metal material, a copper-based metal material, or the like.

The arrangement relationship of the inverter 11 and the high-voltage battery 12 in the vehicle is not limited to the above embodiment, and may be appropriately changed according to the vehicle configuration.

Although the inverter 11 and the high-voltage battery 12 are adopted as the electrical devices connected by the wire harness 10 in the above embodiment, the present disclosure is not limited to this. For example, the present disclosure may be applied to a wire harness that connects the inverter 11 and the wheel drive motor. In other words, the present disclosure is applicable to any wire harness that electrically connects electrical devices installed in a vehicle.

As shown in the example in FIG. 4, the discharge holes 28 may be through holes that penetrate the sheet-shaped molded article 29 in the thickness direction. The discharge holes 28 promote the discharge of solid particles such as sand particles or solid foreign matter from the side surface of the resin pipe 27, and are also advantageous in reducing the weight of the resin pipe 27. This similarly applies to the discharge holes 40 shown in FIG. 5.

As shown in the example in FIG. 2, the large number of discharge holes 28 may be uniformly dispersed over the entirety of the sheet-shaped molded article 29 or in a predetermined region thereof. This similarly applies to the discharge holes 40 in FIG. 5.

In the example shown in FIG. 2, the discharge holes 28 form a plurality of discharge hole rows that extend in the axial direction. Each discharge hole row is formed by a plurality of discharge holes 28 that are aligned in a row in the axial direction. The discharge hole rows are parallel to each other and separated from each other in the circumferential direction. This similarly applies to the discharge holes 40 shown in FIG. 5.

The discharge holes 28 can have a constant shape, that is to say a non-deformable shape. In the illustrated embodiment, the discharge holes 28 may all have the same shape and may all have the same dimensions. In other examples, the discharge holes 28 may include a first group of holes made up of first discharge holes that have the same shape and dimensions, and a second group of holes made up of second discharge holes that the same shape and dimensions, and the shape and/or size of the second discharge holes may be different from that of the first discharge holes. This similarly applies to the discharge holes 40 shown in FIG. 5.

As shown in the example in FIG. 2, the groove portions 30 may correspond to the discharge hole rows. In the sheet-shaped molded article 29, the groove portions 30 are not required to be formed between two discharge hole rows that are adjacent to each other in the circumferential direction.

As shown in the example in FIG. 2, the sheet-shaped molded article 29 may have a first surface or an outer surface in which the groove portions 30 are formed and a second surface or an inner surface in which the groove portions 30 are not formed.

The resin pipe 27 shown in FIG. 2 and the protector 26 shown in FIG. 5 may be an electrically insulating tubular exterior member. The resin pipe 27 shown in FIG. 2 is an example of a straight tubular exterior member. The resin pipe 27 may regulate the wiring path of the electrical wire member 20 over the length of the resin pipe 27. The protector 26 shown in FIG. 5 is an example of a tubular exterior member that has one or more bent portions. The protector 26 may regulate the wiring path of the electrical wire member 20 over the length of the protector 26.

It will be apparent to those skilled in the art that the present disclosure may be embodied in other specific forms without departing from the technical idea of the disclosure. For example, some of the portions described in the embodiment (or one or more aspects thereof) may be omitted, or some portions may be combined. The scope of the disclosure is intended to be determined with reference to the appended claims, along with the full range of equivalents to which it is entitled.

The invention claimed is:

1. A wire harness comprising:
   an electrical wire; and
   an exterior pipe through which the electrical wire is inserted, the exterior pipe including:
      a plurality of discharge holes configured to outwardly discharge foreign matter that has entered between the exterior pipe and the electrical wire, and
      a plurality of grooves positioned on an outer surface of the exterior pipe, each of the plurality of grooves respectively extending from and contacting a first edge of a first discharge hole of a respective pair of discharge holes of the plurality the discharge holes to contact a second edge of a second discharge hole of the respective pair of discharge holes of the plurality of the discharge holes, and the first discharge hole of the respective pair of discharge holes of the plurality of the discharge holes and the second discharge hole of the respective pair of discharge holes of the plurality of the discharge holes are adjacent in an axial direction of the exterior pipe.

2. The wire harness according to claim 1, wherein the exterior pipe has a honeycomb structure in which the plurality of discharge holes are formed in a hexagonal shape.

3. The wire harness according to claim 1, wherein chamfers are formed in ends of the plurality of discharge holes on an electrical wire side.

4. The wire harness according to claim 1, wherein the exterior pipe is a sheet-shaped molded article that is rolled into a tubular shape.

5. The wire harness according to claim 4, wherein the plurality of grooves that extend in the axial direction are formed in the exterior pipe at intervals in a circumferential direction.

6. The wire harness according to claim 5,
   wherein a plurality of circumferential lines travel around the exterior pipe, each of the plurality of circumferential lines passing through a center of each of the discharge holes it passes through, and each of the plurality of grooves is positioned between the respective pair of adjacent discharge holes along a respective line of the plurality of circumferential lines.

7. An exterior pipe through which an electrical wire is to be inserted, the exterior pipe comprising:
   a body with a plurality of discharge holes configured to outwardly discharge foreign matter that has entered between the body and the electrical wire, the plurality of discharge holes are provided in an aligned arrangement, and
   a plurality of grooves positioned on an outer surface of the exterior pipe, each of the plurality of grooves respectively extending from and contacting a first edge of a first discharge hole of a respective pair of discharge holes of the plurality the discharge holes to contact a second edge of a second discharge hole of the respective pair of discharge holes of the plurality of the discharge holes, and the first discharge hole of the respective pair of discharge holes of the plurality of the discharge holes and the second discharge hole of the respective pair of discharge holes of the plurality of the discharge holes are adjacent in an axial direction of the exterior pipe.

\* \* \* \* \*